Aug. 22, 1967  W. V. SMITH ETAL  3,337,222
QUICK ACTING SUBMARINE SHAFT SEAL
Filed Sept. 25, 1964  2 Sheets-Sheet 1

FIG. I.

INVENTORS
WATT V. SMITH
RONALD L. WARD
BY
ATTYS.

INVENTORS
WATT V. SMITH
RONALD L. WARD
ATTYS.

United States Patent Office 3,337,222
Patented Aug. 22, 1967

3,337,222
QUICK ACTING SUBMARINE SHAFT SEAL
Watt V. Smith and Ronald L. Ward, Severna Park, Md., assignors to the United States of America as represented by the Secretary of the Navy
Filed Sept. 25, 1964, Ser. No. 399,422
2 Claims. (Cl. 277—34.3)

The invention described herein may be manufactured and used by or for the Government of the United States of America for governmental purposes without the payment of any royalties thereon or therefor.

This invention relates to a seal around a moving shaft and more particularly to a sealing device capable of automatic or manual actuation in a very short period of time to provide a seal between a movable shaft and the hull of a submarine or other vessel.

Deep submergence submarine seals as usually constructed in the past consist of a series of elements used to exclude the sea intrusion along the space between the shaft and the hull. This series of prior art elements, in order from the sea to the hull interior, are (a) an inflatable ring, (b) a mechanical seal, (c) a second mechanical seal and (d) a packing. The inflatable ring (a) consists of a ring roughly rectangular in cross-section made of a suitable elastomer and having a hollow core connected to the hull interior thru a pipe and valve system to an air supply or other source of high pressure fluid. When fluid pressure is admitted to the hollow core at a higher level than the outside sea pressure the elastomer expands radially inward closing off the space between the shaft and the hull and preventing sea water intrusion into the hull and permitting work to be accomplished on the mechanical seals. The inflatable ring cannot be used with the shaft rotating without destroying the elastomer as a result of the high friction and high thermal expansion of the elastomers usually employed.

The mechanical seals (b) are of the type known as balanced pressure face seals in the seal industry. In this seal, a narrow face of a sealing material such as carbon or copper-lead is held against a plain face of harder material such as Stellite or Tungsten Carbide by the combination of a series of light springs (primarily intended to provide initial closure of the seal and to maintain closure at very low submergence) and the hydraulic pressure of the medium being sealed acting on area that approximated 55 to 80% of the seal face area. Thus fluid pressure existing on the seal face, tending to open the seal, offsets in part the hydraulic closing force and reduces the surface pressures of the wearing contacting seal surfaces. The two mechanical seals are interconnected by pipes and valves so that either seal may, at the operator's option, be made to accept the pressure load. Although these seals in actual service have proven to be reasonably long lived and reliable, it is recognized that if the wear of the seal allows the pressure to penetrate over an area greater than the balance area, the seal may open up and flooding may ensue. With two seals in tandem should one seal fail the other would automatically assume the pressure load. In the improbable event of both seals failing, the final safety is the packing. At the present time, this packing (d) consists of three to five rings of a flexible braided material such as flax impregnated with lubricants such as tallow wax and graphite or molybdenum disulfides. A gland follower loaded by nuts operating on a series of screws serves to compress the packing into contact with the shaft.

This foregoing prior art arrangement suffers from several disadvantages. First, it must be set up by hand by tightening the nuts; second, it is characteristically a high friction device requiring very careful setting up and adjustment and a fairly high leakage rate to provide cooling even in a relatively low pressure, low surface velocity operation.

Accordingly, an object of this invention is to provide an improved seal arrangement in which both the inflatable ring and packing of the prior art types are replaced by improved means.

Another object is to provide a novel seal arrangement enabling repairs of inboard seals while submerged.

A further object of the invention is the provision of an inboard seal capable of allowing the submarine to operate as near to ideal design capabilities as possible.

Still another object is to provide a seal that enables shaft rotation without deleteriously affecting the seal.

Yet another object of the present invention is to provide means for rapid shut off of the clearance between the shaft and hull thus restricting possible in rush of water.

A still further object is to provide lower frictional heating through use of low friction bearing components.

Yet a still further object is to provide a novel seal of improved construction enabling higher operating speeds and deeper submergence.

Other objects and many of the attendant advantages of this invention will be readily appreciated as the same becomes better understood by reference to the following detailed description and claims when considered in connection with the accompanying drawings in which like reference numerals designate like parts throughout the figures thereof and wherein:

Figure 1:
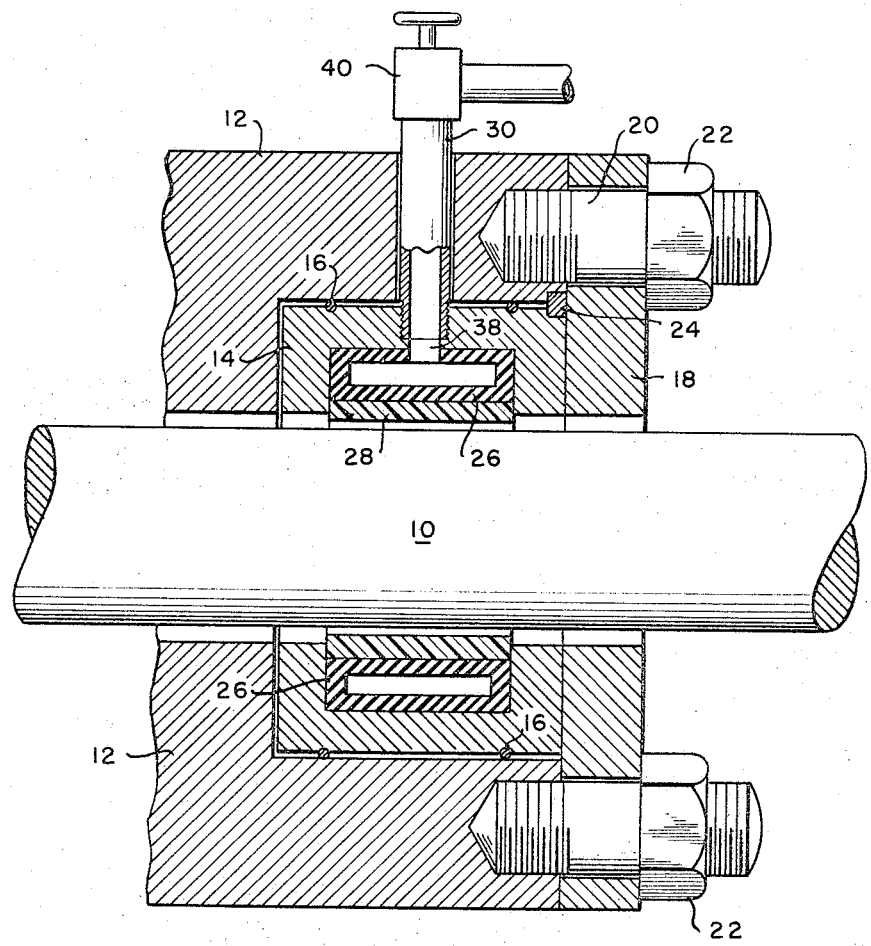
FIG. 1 shows a partial view in longitudinal cross section of a quick acting submarine shaft seal according to an embodiment of the present invention.

Referring now to the drawings, there is shown in FIG. 1 a shaft 10 protruding from the hull of a submarine or other vessel. Surrounding the shaft 10 is a housing 12 for sealing the gap between the shaft and the hull. Within the housing 12 is a packing box 14. The packing box 14 fits closely into a bore in the housing 12 and is sealed on its outside diameter by O-rings 16. The packing box 14 is held within the bore of the housing 12 by a closure plate 18. The closure plate is held in place by nuts 22 secured to the stud bolts 20 which protrude from the housing 12. Rotation of the packing box 14 is prevented by keys 24 which mate with the housing 12 and packing box 14 and are retained by closure plate 18.

Packing box 14 has an inner annular groove for holding an annular inflatable bladder 26 made of a solid elastomer that may contain cloth inserts or other strengthening means suitable for the pressure involved. The exterior surfaces of the inflatable bladder 26 are bonded to the interior surface of the annular space of the packing box 14 by means of a suitable epoxy or other bonding agent. The interior surfaces of the inflatable bladder adjacent to the exterior of the shaft 10 are bonded to an annular elastic low friction material 28 such as is sold under the trademark Teflon. The elastic low friction material 28 may be woven Teflon, double woven Teflon cotton cloth, Teflon-cotton-phenolic laminates or any other material dense enough to only pass enough seepage water to lubricate the rotating shaft under the pressure of its working environment, yet having low friction under rubbing contact and high resistance to abrasion. This seepage should be in the order of drops. The inflatable bladder 26 contains one or more openings communicating with a source of pressure, equal to or greater than the sea pressure to be sealed, through an appropriate piping system 30. The piping system has a passage 38 communicating with the bladder and through a valve 40 to a source of pressure.

Introduction of pressure to the inflatable bladder 26 causes the bladder to expand inwardly forcing the elastic low friction material 28 to close the gap between the shaft and packing box 14 thus effecting a seal between the shaft and the hull. The woven Teflon will absorb the resulting wrinkles when the annulus of elastic material is made smaller to seal around the shaft. In the event a semi-rigid material is chosen as the sealing material, the sealing ring is made in segments to absorb the resulting slack when the seal is made with the shaft.

Since a low friction wear material is used for the lining 28 the seal will operate with low heat buildup and leakage.

The pressure supply to effect the sealing may be arranged in a variety of ways. A valve to a reservoir of pressure may be actuated by either manual control or by a solenoid in response to an electrical sensing of the rate of leakage along the shaft. Another source of pressure to effect the sealing may be sea pressure itself to actuate the seal.

Figure 2:
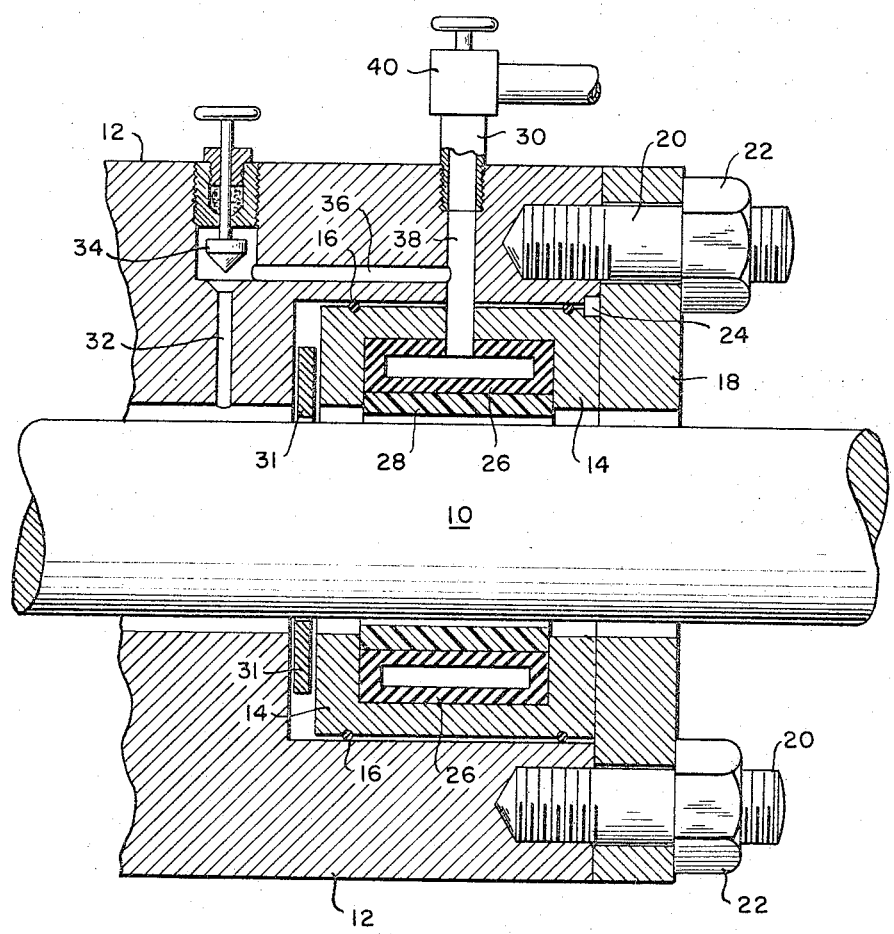
FIG. 2 shows in longitudinal cross sectional view a modification of the shaft seal of FIG. 1 encompassing an automatic seal.

A device for utilizing sea pressure to effect the seal is shown in FIG. 2. This device may also serve as an emergency seal in the event an outer seal fails.

FIG. 2 shows a floating restrictor 31 between the shaft 10 and the packing box 14. Fluid flow passes between the floating restrictor 31 and shaft 10 until the flow exceeds the flow of the leakage through the seal or the restrictor at which time the fluid is forced up a passage 32, through a normally open valve 34 to another passage 36 and then into the passage 38 of the piping system 30 from whence it applies pressure to the bladder 26. The valve 40 of the pipe system 30 is normally closed. This causes the fluid under pressure entering through the passages 32, 36 and 38 to build up in the cavity of the inflatable bladder 26 forcing the elastic low friction material sealing member 28 into contact with the shaft 10 and reducing leakage to tolerable rates. By opening valve 40 and closing valve 34 the inflatable seal can be allowed to open in the same manner as in FIG. 1. By adjusting the pressure admitted through valve 40 to something less than that required to close the seal, the pressure required to be admitted through valve 34 for closing the sealing surface 28 may be reduced to an absolute minimum required for satisfactory sealing.

The seal shown in FIG. 2 when used as an inner seal would serve as a protective seal against failure of the outer seal i.e. the seal furtherest from the interior of the hull and nearest the sea. In such an arrangement failure of the outer seal would result in a surge of sea water along the shaft 10. A restrictor 31 closely surrounding the shaft like a washer would allow but a small amount of fluid to pass between the restrictor and the shaft thus forcing the fluid through the passages 32, 36, and 38 to inflate the bladder 26 to effect a seal between the elastic material 28 and shaft 10. An example of the spacing between the restrictor and shaft is 0.01 inch while the spacing between the sealing material in the open position and shaft is 0.125 inch. The restrictor 31, by keeping to a minimum the amount of fluid leakage between the elastic material 28 and shaft 10, allows a pressure to build up through the bladder 26 on the exterior surface of the elastic sealing material 28 while keeping the pressure on the interior surface of the elastic sealing material to a minimum.

Elastic low friction seal member 28 may take a variety of forms. It may be a woven material cemented to the inside of the inflatable bladder 26 and to the end of the packing box 14. The seal member may be a pair of metal or plastic shells, having tongue and grooved mating at the parting line, held apart by springs and held in thrust by the end wall of the bore in the packing box 14 and held in alignment by keys or pins (not shown). If the sealing member 28 is made of a self supporting semi-rigid material it need not be bonded to the inflatable bladder 26. The material of the seal member 28 is to be selected on the basis of having adequate strength, corrosion resistance, friction resistance and wear resistance for the specific application.

Figure 3:
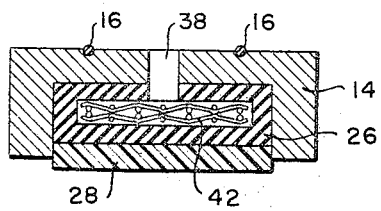
FIG. 3 shows a modified inflatable bladder for use in conjunction with the seal of the invention.

An inflatable seal on the ocean side of the active seal has the exterior and interior walls of the inflatable bladder held together for long periods. Being held together the walls may bond and on inflation the bladder may be ruptured and the seal made ineffective. In order to prevent this type of failure the cavity of an inflatable bladder is filled with layers of woven wire mesh 42 as shown in FIG. 3. The wire mesh prevents the walls of the bladder 26 from coming into contact with each other and thus eliminates any possibility of the walls becoming bonded together.

Obviously many modifications and variations of the present invention are possible in the light of the above teachings. It is therefore to be understood that within the scope of the appended claims the invention may be practiced otherwise than as specifically described.

We claim:
1. A quick acting submarine shaft seal comprising:
   elastic inflatable bladder about the circumference of a shaft, whereby said bladder is not in contact with the shaft when deflated and expands towards the shaft when inflated;
   a low friction material attached to said elastic inflatable bladder and interposed between said bladder and said shaft whereby said low friction material is brought into a sealing relationship when said elastic inflatable bladder is expanded; and
   a conduit communicating with the inside of said elastic inflatable bladder and the outside seawater whereby the seawater pressure will expand said inflatable bladder;
   a restrictor in the form of a flat washer around the shaft and in close proximity thereto, oriented outboard along the shaft from said inflatable bladder whereby any surge of fluid along the shaft from the sea is restricted from further passing along the shaft and is forced into said conduit tube thereby shortening the time required to inflate said bladder and close the seal.
2. A sealing device according to claim 1 and further including woven wire mesh within the inflatable bladder so that the walls of the bladder will not bond together.

References Cited

UNITED STATES PATENTS

| | | | |
|---|---|---|---|
| 1,373,485 | 4/1921 | Bugg | 152—350 |
| 2,648,554 | 8/1953 | Gilbert | 277—34 |
| 2,906,552 | 9/1959 | White | 277—227 X |
| 2,943,874 | 7/1960 | Valdi et al. | 277—34.3 |
| 3,007,518 | 11/1961 | Simpson | 277—34 X |
| 3,176,996 | 4/1965 | Barnett | 277—3 |
| 3,262,707 | 7/1966 | Williams | 277—34.3 |

SAMUEL ROTHBERG, *Primary Examiner.*